United States Patent [19]
Berg et al.

[11] 3,840,937
[45] Oct. 15, 1974

[54] SEPARATOR MECHANISM WITH CUTTER SENSOR FOR LIGATURE CONNECTED FRANKFURTERS

[75] Inventors: Rudolph Berg, Nutley; Otto Bantel, Union; Howard D. Taylor, Morristown, all of N.J.

[73] Assignee: Linker Machines, Inc., Newark, N.J.

[22] Filed: Sept. 25, 1972

[21] Appl. No.: 292,018

Related U.S. Application Data

[63] Continuation-in-part of Ser. No. 260,019, May 24, 1972, abandoned, which is a continuation of Ser. No. 105,442, Jan. 11, 1970, abandoned.

[52] U.S. Cl................................................ 17/1 F
[51] Int. Cl........................................... A22c 11/00
[58] Field of Search........................................ 17/1 F

[56] References Cited
UNITED STATES PATENTS

| | | | |
|---|---|---|---|
| 3,156,006 | 11/1964 | Gouba | 17/1 F |
| 3,545,035 | 12/1970 | Piereder | 17/1 F |
| 3,646,637 | 3/1972 | Brendt | 17/1 F |

*Primary Examiner*—Hugh R. Chamblee
*Attorney, Agent, or Firm*—Albert C. Nolte, Jr.

[57] ABSTRACT

Apparatus for separating a line of ligature connected frankfurters into individual frankfurters comprises a feeler for sensing a ligature and for operating, through a linkage, a knife which cuts the ligature. The linkage includes means for distinguishing between a connecting ligature and an irregularity in a frankfurter so that the knife is operated only when a ligature is at the cutting station and not to cut a frankfurter.

33 Claims, 17 Drawing Figures

SEPARATOR MECHANISM WITH CUTTER SENSOR FOR LIGATURE CONNECTED FRANKFURTERS

This application is a continuation-in-part of our pending U.S. Pat. application, Ser. No. 260,019, filed May 24, 1972 which in turn is a continuation of U.S. Pat. application Ser. No. 105,442 filed Jan. 11, 1970, both applications now abandoned.

This invention is concerned with a device for severing the ligatures connecting frankfurters in a line of frankfurters. Particularly it is concerned with such a device in which means are provided for sensing the ligatures and causing the severing knife to be operated only when a ligature is at the location where cutting takes place.

According to one aspect of the invention provision is made for the sensing means to distinquish between ligatures and irregularities in the frankfurters as for example may be caused by the use of natural (as distinct from synthetic) casings.

From another aspect there may be provided means for accommodating different speeds of travel of the line of frankfurters as they are conveyed to the cutting area so that the period between the ligature being sensed and the knife being operated can be varied to suit the time taken for the ligature to move from the sensing station to the cutting station.

These and other features of the invention will become apparent from the following disclosure.

The invention is illustrated by way of example in the accompanying drawings which form a part of this application and in which.

DESCRIPTION OF THE PREFERRED EMBODIMENT

Figure 1:
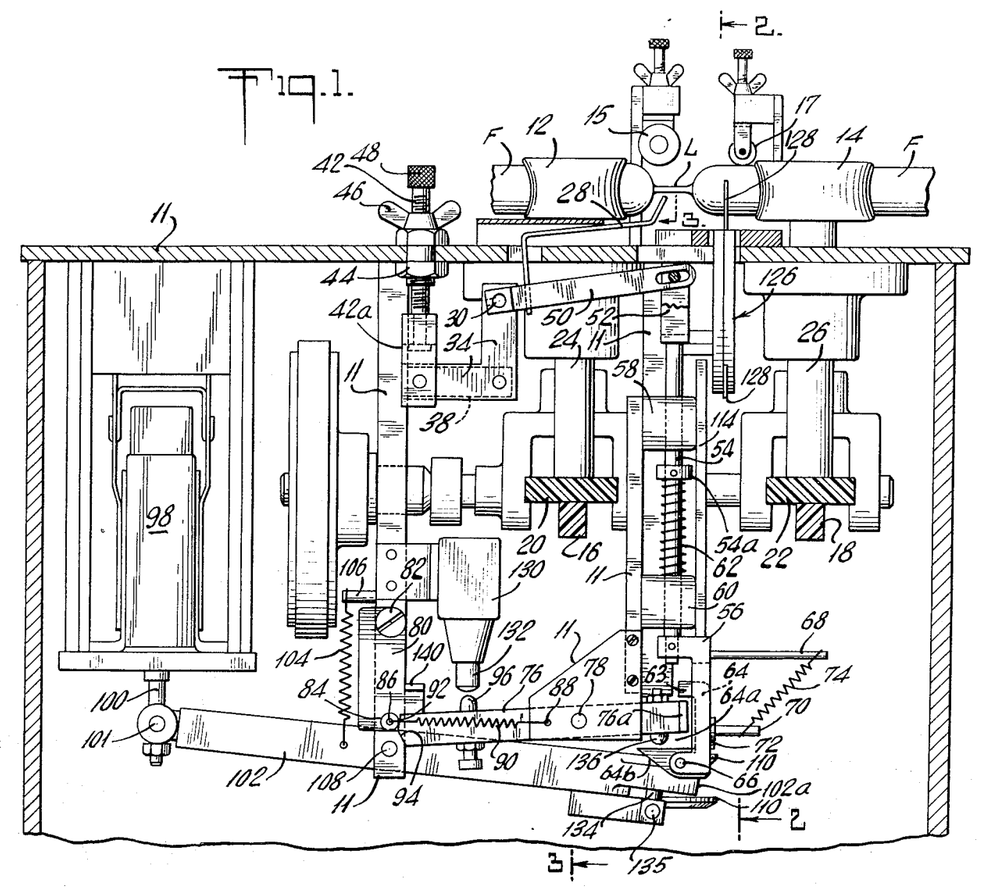
FIG. 1 is a part sectional and part elevational view of the frankfurter separator mechanism constructed in accordance with the teachings of the present invention.
Figure 6:
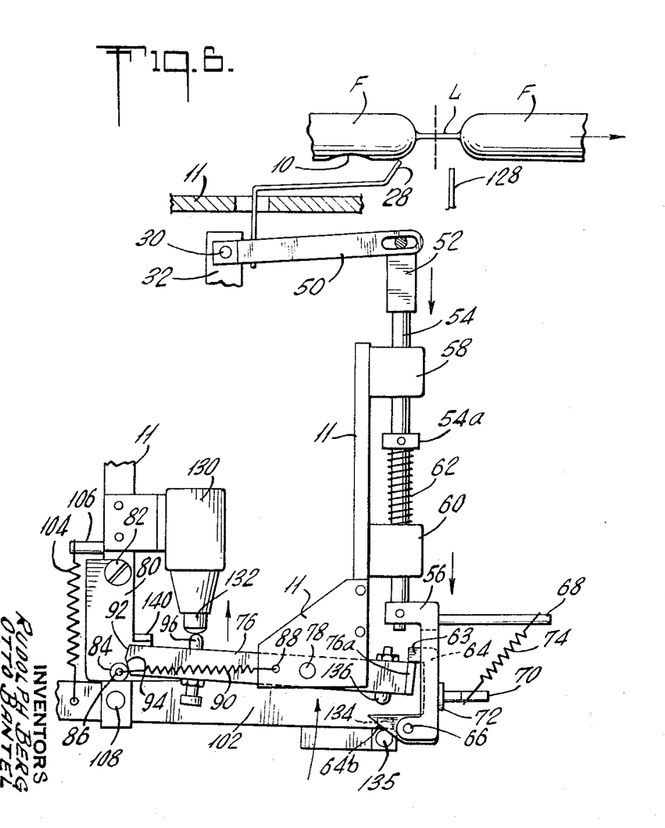
FIG. 6 is a partial diagrammatic view of the mechanism in the position in which the sensing arm causes the solenoid microswitch to be closed and the cutter to be actuated.
Figure 8:
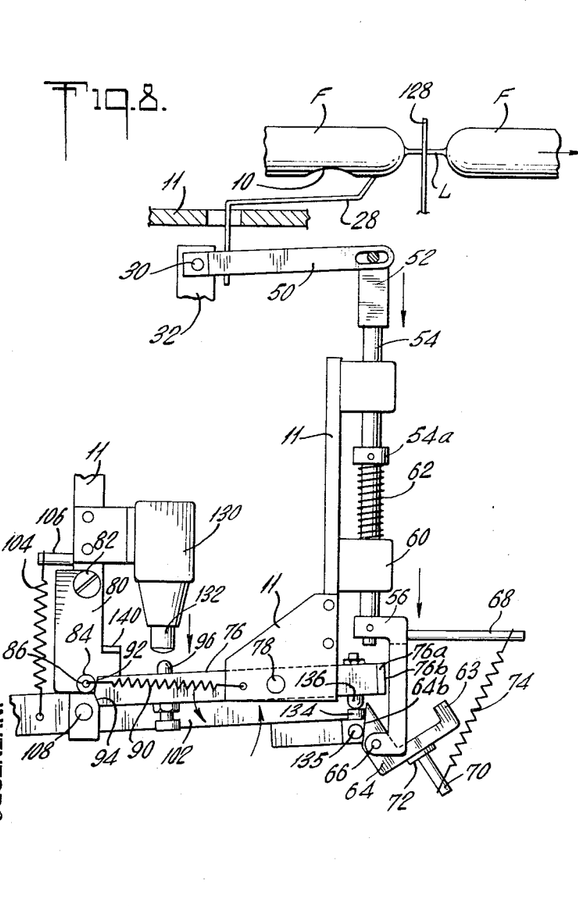
FIG. 8 is a partial diagrammatic view of the mechanism wherein the ligature has been cut and the sensing arm moves to a position whereby the microswitch is opened and cutter mechanism made inoperative.
Figure 9:
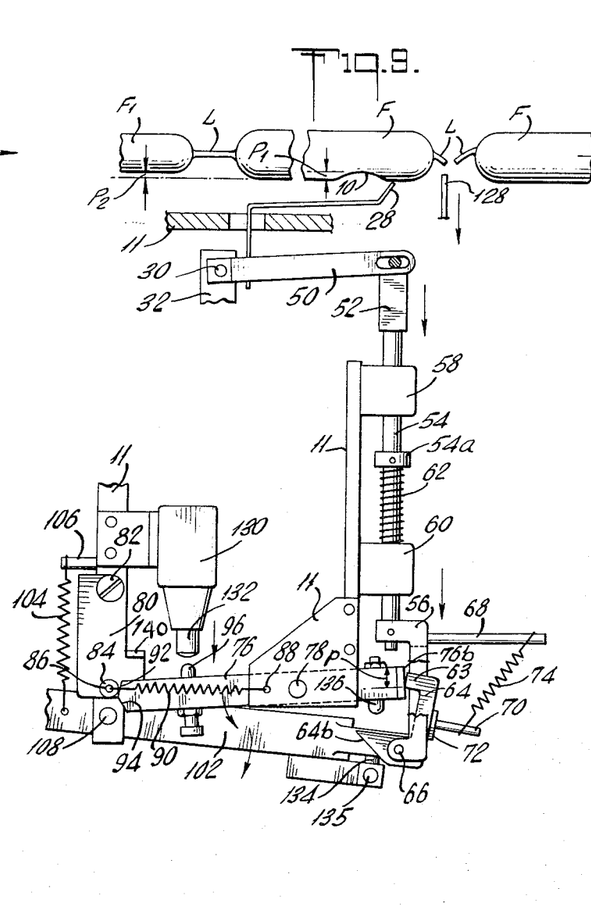
FIG. 9 is a partial diagrammatic view of the mechanism similar to FIG. 8 with the microswitch in the open position and remaining in an inoperative condition, while the pawl rotates counterclockwise.

As seen in FIG. 1 a line of frankfurters, sausages or the like F. are interconnected by ligature L. FIGS. 6, 8 and 9 further disclose frankfurters having indentations 10 and in FIG. 9, the frankfurter $F_1$ on the left hand side is of smaller cross-section than the other frankfurters in the line. The present invention is of particular importance with the use of natural skin or gut frankfurters which often have indentations therein and may be of varying cross-section. Because of the lack of uniformity of the frankfurter dimensions the present invention utilizes a separation mechanism which will make the proper ligature cut each time in spite of the variations in the frankfurter dimensions. It should be noted that natural gut frankfurters may have different thicknesses. In addition, the mechanical handling of these frankfurters prior to the cutting operation frequently causes indentations to be formed in exterior surfaces by the product supports of the mechanical handling equipments.

Figure 2:
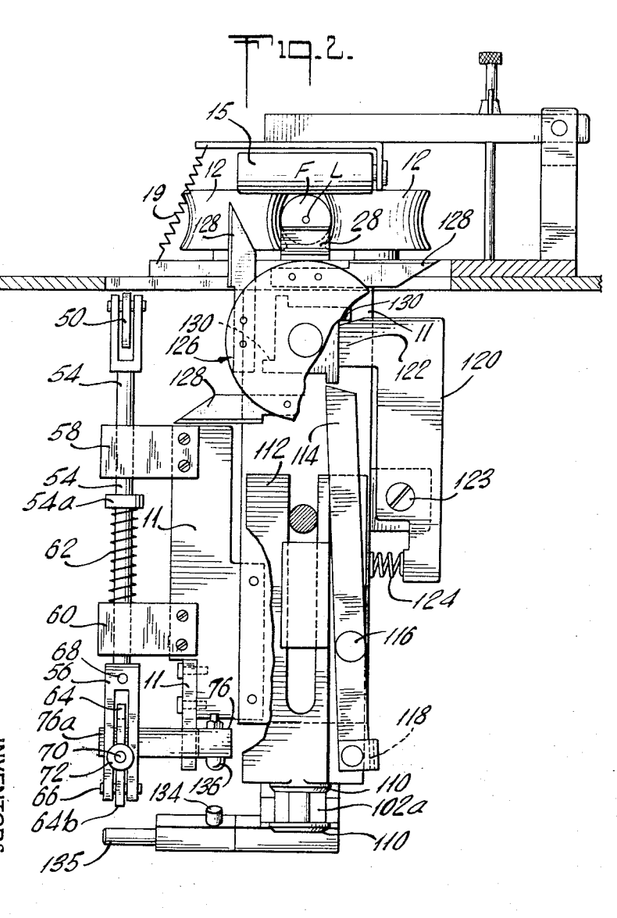
FIG. 2 is a sectional view taken along the lines 2—2 of FIG. 1.

The succession or line of frankfurters F are moved into the cutting position by means of a first pair of spaced rollers 12 and a second pair of spaced rollers 14, each of the latter having a larger diameter than the diameter of each of the rollers 12. Worms 16 and 18 drive worm gears 20 and 22 by means of a motor (not shown). The gears 20 and 22 are connected through shafts 24 and 26 respectively to spaced rollers 12 and 14. Since the worm gears are rotated at the same rate, the peripheral speed of the larger diameter rollers 14 is greater than the peripheral speed of the smaller diameter rollers 12, thereby causing the ligatures L to be stretched when the rollers 14 engage and hold a leading frankfurter F and the rollers 12 engage and hold the following frankfurter F with the stretched ligature L therebetween. With reference to FIGS. 1 and 2, hold-down rollers 15 and 17 for the frankfurters F are shown. The roller 15 is maintained in contact with the top surface of the frankfurter F by means of a spring 19.

Figure 3:
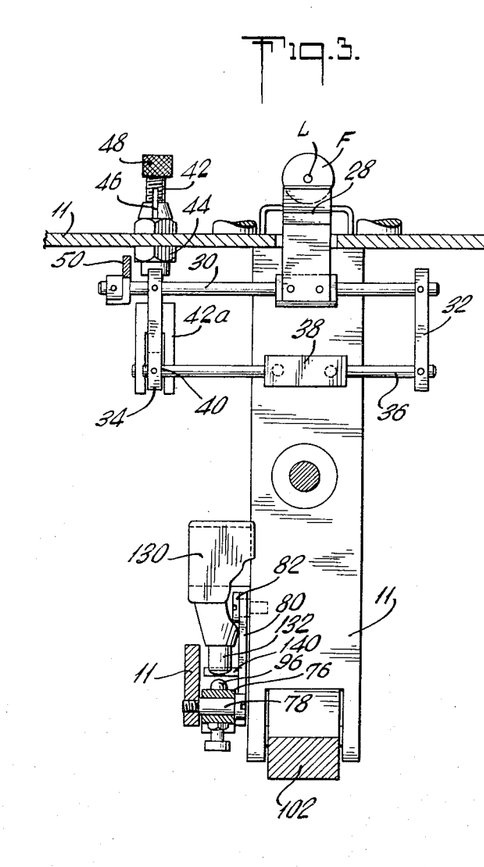
FIG. 3 is a sectional view taken along the lines 3—3 of FIG. 1.
Figure 4:
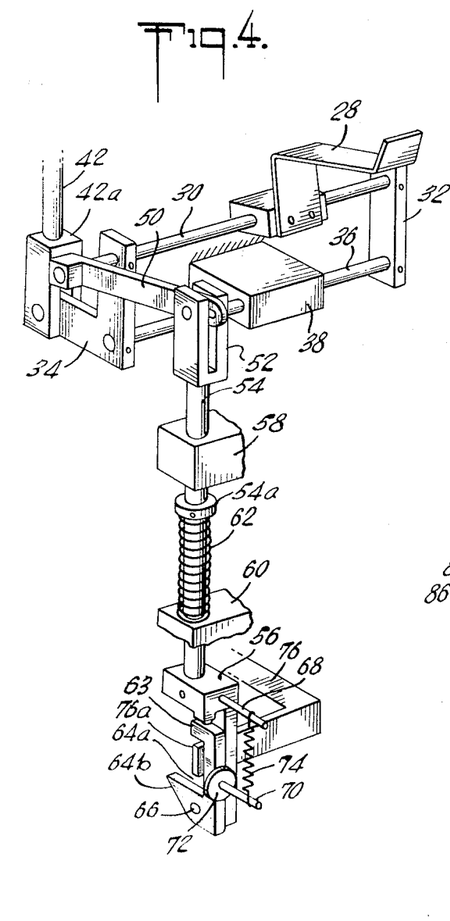
FIGS. 4 and 5 are perspective views of the sensing arm, associated toggle arrangement and pivoting pawl for actuating the cutter to sever the frankfurter ligatures.
Figure 5:
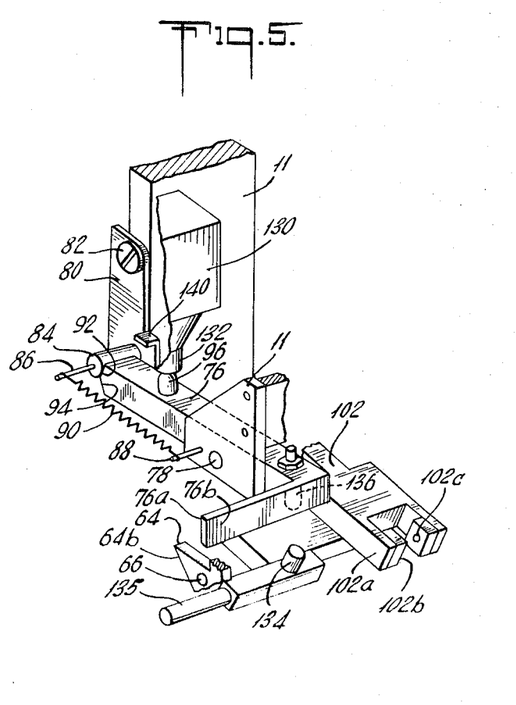

In order to cut each ligature L at the precise moment and location a sensing device is employed having a sensing feeler arm 28 and associated structure. Referring to FIGS. 4 and 5, the feeler arm 28 is mounted on a shaft 30, the latter being rotatably supported on one side in a mount 32 and rotatably mounted on the other side in an L-shaped block 34. A shaft 36, mounted in fixed bearing block 38, is shown in which the L-shaped block 34 is pivoted at 40 on shaft 36. As seen in FIGS. 1, 3 and 4, an adjusting screw 42 is connected at one end to L-shaped block 34 through a "U" shaped adapter 42A in such a manner as to allow screw 42 to rotate freely coincident with only vertical lineal motion of adapter 42A. The screw 42 is screw-connected to threaded nut 44 fixed to the frame 11 of the separator mechanism. A wing nut 46 on screw is provided for holding the feeler arm 28 in its selected adjusted position. Thus, the position of the feeler arm 28 relative to the frankfurters F is adjustable together with subsequent parts of the linkage of the mechanism for a purpose described hereinafter, the adjustment being affected by means of rotating the screw 42 in the selected direction by the knurled finger piece 48 whereby the L-shaped block 34 is pivoted at pivot point 40. When the selected position is reached, the wing nut 46 is tightened.

The feeler arm 28 engages and moves along the bottom surface of each frankfurter F, as seen in FIGS. 1–3, 6, 8 and 9. When the feeler arm 28 moves up into the area where the ligature L is located, as seen in FIG. 1, the link 50 being connected to the shaft 30 at one end moves in an upward direction. The other end of the link 50 is pivotally connected to U-shaped support 52. A vertical shaft 54 is connected at one end to support 52 and at the other end to a U-shaped mounting block 56. The vertical shaft 54 passes freely through fixed bearing blocks 58 and 60 and is provided with a collar 54a. Surrounding the shaft 54 and captured between collar 54a and bearing block 60 is an helical spring 62.

A latching pawl 64 is pivotally mounted in U-shaped mounting block 56 on shaft 66. A post 68 extends generally horizontally from the block 56. Connected to the back surface of the pawl 64 is another post 70 which extends generally transverse to the back surface of the pawl and has a stop 72 in the form of a washer. A spring 74 is connected at one end to the post 68 and at the other end to the post 70. As seen in FIG. 1, the stop 72 permits the pawl to pivot in a counterclockwise direction a limited distance, that is, until the stop 72 abuts a surface of the U-shaped mounting block 56.

As seen in FIGS. 4 and 5, an L-shaped element 76 is pivoted at 78 and has an end 76a which is located in space 64a of the pawl 64. A plate 80 is pivotally mounted at 82 to the frame 11. A roller 84 is projecting transversely to the plate 80 and is rotatably mounted on shaft 86. A rod 88 protrudes from the frame and a tension spring 90 is connected between the shaft 86 and the rod 88. At the other end of L-shaped element 76, remote from end 76a, are a top end flat 92 and a bottom end flat 94. An upstanding button 96 on the L-shaped element 76 projects upwardly therefrom.

It will be appreciated that adjustment of the linkage by means of screw 42 will adjust the longitudinal position of shaft or rod 54 and with it of course the portion of surface 63 of pawl 64 relative to the L-shaped element or beam 76. From the following it will be apparent that lost motion, which is adjustable, will occur between movement of the feeler arm and movement of the beam 76 that lost motion being that during which the rod 54 is moving downwardly but has not yet reached element or beam 76.

Referring to FIG. 1, a solenoid 98 is shown connected to the frame 11 and is provided with a shaft 100 which is pivotally connected at 101 to a solenoid arm 102. A spring 104 is connected between solenoid arm 102 and a pin 106 on the frame 11. The solenoid arm 102 is pivotally mounted on pivot 108. The free end 102a of solenoid arm 102 is bifurcated and engages spaced bosses 110 connected to vertically movable U-shaped plate 112 (FIG. 2) through blocks 102B pivoted about fixed pins 102C in free end 102A. The plate 112 and the following structure relating to the rotating cutter blade mechanism is similar to the structure shown and described in the aforementioned U.S. Pat. application Ser. No. 10,765, filed Feb. 12, 1970.

As seen in FIG. 2, a pawl 114 is pivoted at 116 to the plate 112 and is provided with a biasing spring 118. A plate 120, having a bevelled finger 122, latches the cutter blade mechanism in each selected position thereof. The plate 120 is pivoted at 123 and a spring 124 connects the end of the plate remote from the finger 122 to the frame 11, and biases the plate 120 in a counterclockwise direction.

The knife element 126 is provided with four knife edges 128 (only two of which are shown) spaced apart 90°.

The pawl 114 is so constructed and mounted that upon elevation thereof the end abuts the abutment 130 of the knife element 126, as seen in FIG. 2. The continued upward movement of the pawl 114 causes the knife element 125 to rotate 90° and one of the knife edges 128 cuts the ligature L as it moves through cutting sequence (FIG. 8).

A microswitch 130 is electrically connected to the solenoid 98 and the contact 132 is shown in the direct line of movement of the button 96 on the L-shaped element 76.

Reference is now made to FIGS. 6–9 in which the sequence of operations of the sensing device is shown. In FIG. 6, after the feeler arm 28 has moved from the ligature sensing position of FIG. 1 the link 50 moves the rod 54 downwardly causing the protruding top 63 of the pawl 64 to strike the L-shaped element 76 and pivot the latter on pivot 78, whereby the button 96 engages and closes the contact 132 of the microswitch 130 which actuates the solenoid 98, whereby the solenoid shaft 100 moves downward causing the solenoid arm 102 to pivot at pivot point 108. When this occurs the bosses 110 at the free end of the solenoid arm move upwardly carrying with it movable plate 112 and the pawl 114. In this manner the cutting sequence is initiated and a knife edge 128 rotates to the cutting position shown in FIG. 8. It will be noted that in the position of the L-shaped element 76 in FIGS. 6 and 7 the spring 90 is over the center creating a toggle effect and the element 76 remains latched in this position with the roller 84 on lower end flat 94. In this condition, the microswitch 130 remains closed and the pawl 114 continues to move upwardly until the full cutting sequence of the ligature L is performed. When this occurs, the position of FIG. 8 is reached and a button 134 on the solenoid arm 102 engages a projection 136 on the L-shaped element 76 and pivots the element in the opposite direction on pivot point 78. The spring 90 then snaps over the center and the roller 84 moves to the top end flat 92 (FIGS. 8 and 9).

Figure 7:
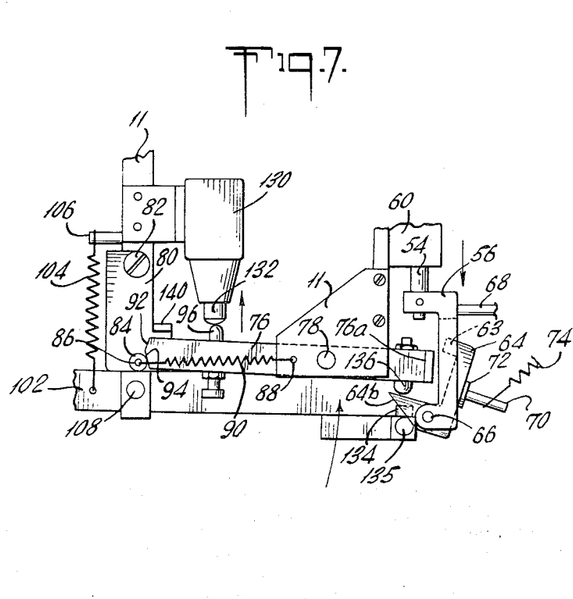
FIG. 7 is a partial diagrammatic view of the mechanism similar to that shown in FIG. 6 in which the solenoid arm has moved slightly upward from the position shown in FIG. 6.

As seen in FIG. 7, as solenoid arm 102 rises and before button 134 engages 136, a projection 135 on solenoid arm 102 strikes the surface 64b of pawl 64 thereby rotating pawl 64 clockwise so the end 63 of the pawl clears end 76a thereby freeing the element 76 so that the latter can be moved when button 134 engages projection 136.

The plate 80 is mounted for pivotal movement at 82, as seen in FIG. 8, and is further provided with a stop 140 to limit the upward movement of the adjacent end of L-shaped element 76 so that roller 84 will not move off the lower end flat 94.

After the button 134 on the solenoid arm 102 engages the projection 136 and moves the element 76 so that microswitch is opened the solenoid arm 102 is moved downwardly whereby projection 135 clears the surface 64b (FIG. 9) enabling the top 63 of the pawl 64 to ride on end surface 76b. The pawl 64 is pivoted counterclockwise by means of the action of spring 74. However, as shown in FIG. 9, the feeler arm 28 is in a downward position and the pawl 64, which under the influence of spring 74, pivots in a counterclockwise direction to a position, as stated hereinbefore, whereby the top 63 of the pawl 64 engages the end surface 76b of the L-shaped element 76.

As seen in FIGS. 8 and 9 an indentation 10 appears in the frankfurter F or, as seen in FIG. 9, the frankfurter $F_1$ has a smaller diameter than the frankfurter F. In this event, the feeler arm, shaft 54, block 56 and pawl 64 will move upwardly as a result of the indentation 10 or as a result of a thinner frankfurter. However, as seen in FIG. 9, since the distance P on the end surface 76b of the L-shaped element 76 is greater than the distance $P_1$ shown on the frankfurter F or the distance $P_2$ on the frankfurter $F_1$ of smaller cross-section the end 63 of the pawl will not move to a position over the top surface of the element 76, as seen in FIG. 6. Therefore, the microswitch 130 will not be actuated and an improper cut of the frankfurter will not be made. Thus, the present mechanism ensures that the cutting sequence will only be made at the ligatures L regardless of the non-uniformity of the frankfurters.

It is to be appreciated that the adjustment of the position of rod 54 will vary the lost motion occurring before surface 63 of pawl 64 reaches beam or element 76 so that the ligature moves from that position in which it is sensed to the position in which it is to be cut before the knife is operated. This adjustment accommodates speed and shape of sausage variations in the travel of the sausage conveyor.

Figure 10:
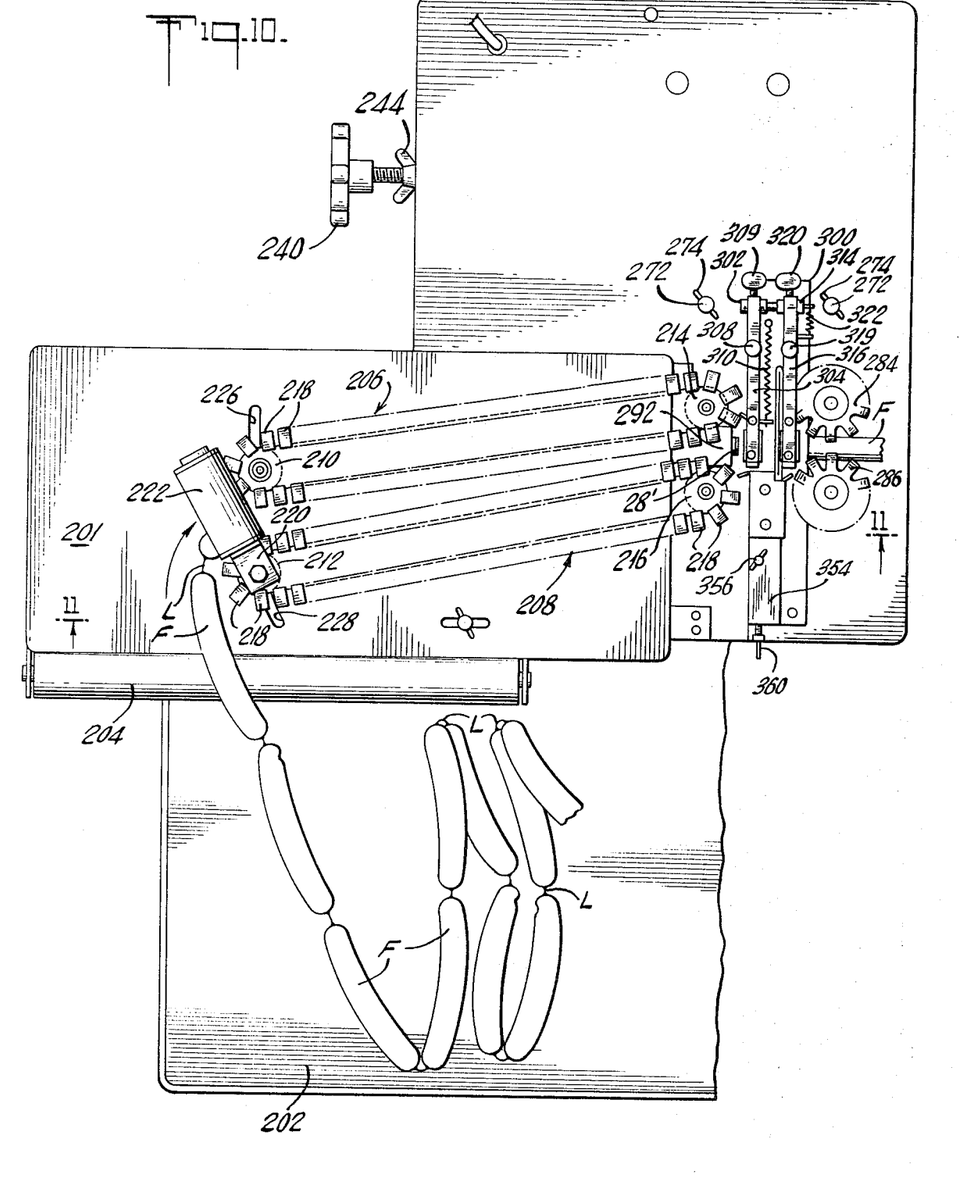
FIG. 10 is a plan view of a feed mechanism for delivering sausages to the modified separating section of the mechanism but one which may be utilized in conjunction with the mechanisms of FIGS. 1–9.

The preferred feed mechanism for the apparatus is illustrated in FIGS. 10, 11, 12, 14, 15 and 16. Basically it comprises a belt conveyor 200 mounted in part on a subassembly 201 which is removable from the main frame for cleaning and maintenance as seen particularly in FIG. 12, and being secured to the frame by a wing nut or similar easily removed locking element as shown in FIG. 10.

A line of sausages are supported in a pan 202 which is offset from the converging path of the conveyor 200 and the sausages are led over an idler roller 204 mounted on the edge of the subassembly 201 to the conveyor 200.

The conveyor comprises a pair of belts 206 and 208 trained around idler sprockets 210 and 212 and around driven sprockets 214 and 216, sprockets 210 and 214 being associated with belt 206 and sprockets 212 and 216 with belt 208. The sprockets 214 and 216 are mounted in a manner described hereinafter on the main frame of the apparatus.

Figure 16:
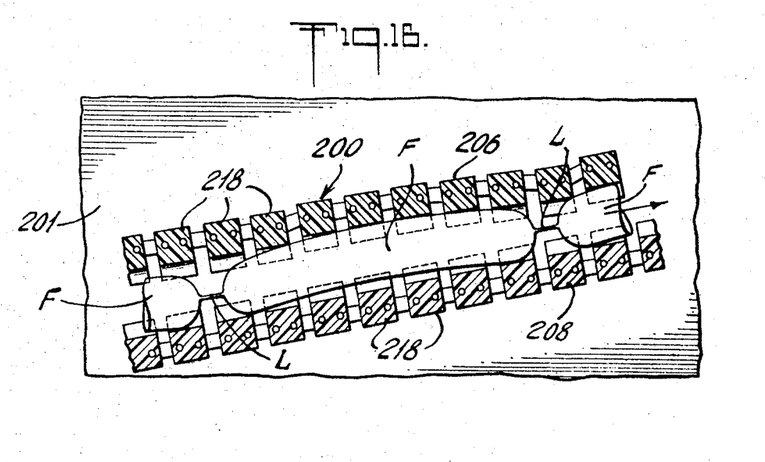
FIG. 16 is a detail of the feed belts of the mechanism in FIG. 10.

As shown in FIG. 16 the belts are held relatively loosely so that they may flex to accommodate the curve which commonly appears in frankfurters in which the casing is natural as distinct from synthetic. Additionally, the sausage contacting elements 218 of the belts have their sausage contacting surfaces of concave form to give as large as possible an area of engagement with the sausage.

Mounted upon an extension of the shaft mounting sprocket 212 is a bracket 220 which supports a hold down roll 222 by which the sausages are guided into the path defined by the conveyor belts 206 and 208.

It will be appreciated that by offsetting the pan 202 from the path of the conveyors the line of frankfurters is caused to be turned as the frankfurters enter the nip of the conveyors so that the connecting ligatures tend to be stretched to a certain extent to facilitate cutting.

The belts are adjustable to accommodate different sizes of frankfurters and to this end the pinions 210 and 212 are mounted upon shafts which are clamped by means of wing nuts (one of which, 224, is visible in FIG. 12) in desired positions along arcuate slots 226 and 228 formed in subassembly plate 201. In this way the spacing between sprockets 210 and 212 is adjustable.

Figure 15:
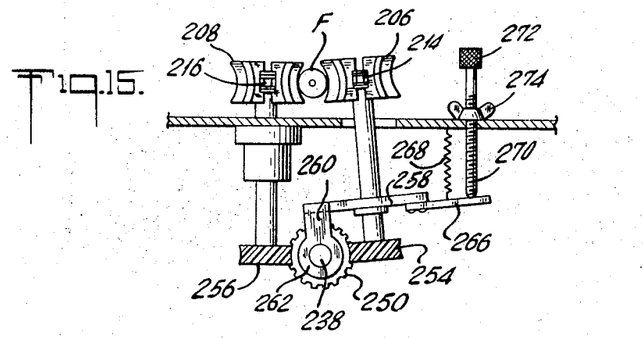
FIG. 15 is a section on line 15—15 of Fig. 14.

The sprockets 214 and 216 are driven by a common motor 230, variable pitch pulleys 232,234, vee belt 236 and shaft 238 (see FIG. 15). The pitch of pulley 232 is adjustable by means of hand wheel 240 and screw 242 which shifts the spacing between opposed halves of the pulley wheel. A locking nut 244 is associated with screw 242 to lock the pulley at a desired pitch.

The vee belt 236 is trained around a pulley 234 which accommodates the variations in pitch of the pulley 232 by having one half of the pulley 234 spring biased by spring 246 towards the other half. In this way, the speed of rotation of shaft 238 is variable by hand wheel 240.

Mounted upon shaft 238 are worms 250 and 252 of which worm 250 is associated with the conveyor 200 and worm 252 has a function described hereinafter.

Driven by worm 250 are a pair of worm wheels 254 and 256, wheel 254 being mounted upon that shaft which carries sprocket 214 and wheel 256 being mounted on the shaft which carries sprocket 216.

To effect adjustment of the spacing of sprockets 214 and 216, the shaft of sprocket 214 is mounted in a bracket 258 from which depend two arms 260 which carry collars 262 which are fitted on shaft 238 and mount the bracket for pivoting movement thereabout. In this way the bracket can be pivoted and with it the shaft carrying sprocket 214 while worm wheel 254 is maintained in engagement with worm 250. Extending from the bracket 258 is an arm 266 which is spring loaded to urge the bracket to move sprocket 214 towards sprocket 216. The spring loading is derived from spring 268 which extends from the arm 266 to the underside of the main frame. To limit the extent to which sprocket 214 may move towards sprocket 216 a stop is made for cooperation with arm 266, that stop being constituted by a bolt 270 which is received in a threaded opening in the main frame of the device and which terminates in a knurled head 272. A wing nut 274 serves as a lock nut for securing the bolt in position.

Also mounted on the shaft 238 is second worm 252 which cooperates with worm wheels 280 and 282 to drive frankfurter engaging wheels 284 and 286 which are located on the opposite side of the cutting and sensing region to the sprockets 214 and 216. The wheels 284 and 286 are toothed as may be seen in FIG. 10 and the radially outermost edges of the teeth are concave to give a large contact area with the frankfurter. Wheel 284 is made movable relatively to wheel 286 to accommodate different diameter sausages by mounting worm wheel 282 on bracket 288 which is mounted by collars 290 on shaft 238 and which has an arm 296 with which are associated similar spring biasing and limiting means to those illustrated in FIG. 15.

Figures 11, 17:
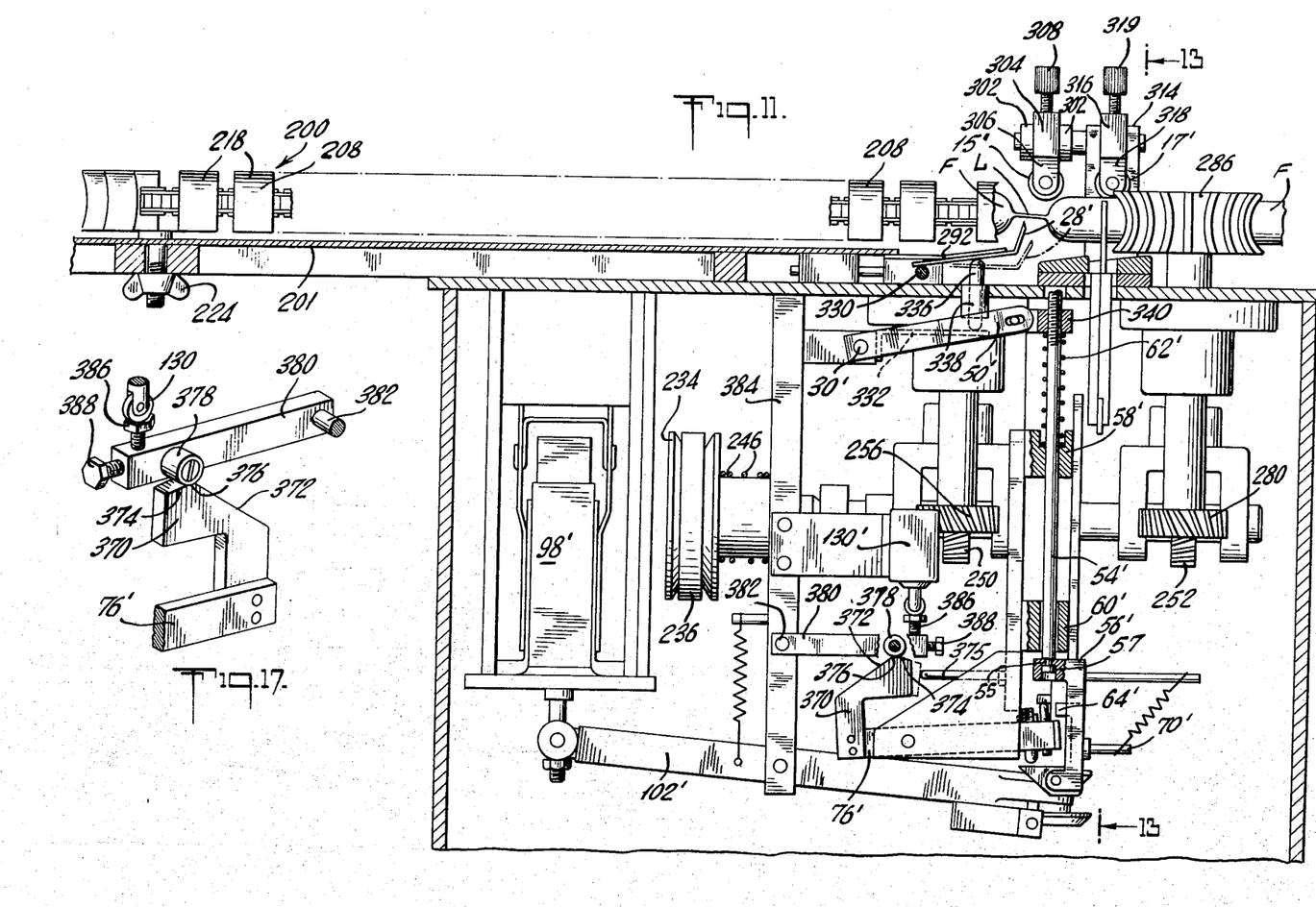
FIG. 11 is a part sectional and part elevational view of the modified sausage separating mechanism shown on a small scale in FIG. 10.
FIG. 17 is a perspective view of a detail of the mechanism in FIG. 11.

As will be seen in FIG. 11 the horizontal center line of the wheels 284 and 286 are disposed slightly lower than those of wheels 214 and 216. This feature in conjunction with the positioning of an adjustable tongue 292 serves to ensure that different diameter frankfurters pass through the cutting region with their lower edges at substantially similar heights above the main frame.

Referring more to the remaining parts of the embodiment illustrated in FIGS. 10 through 17 it will be seen that they are in large part similar to the embodiment of FIGS. 1 through 9 and in the interests of brevity only those parts of the apparatus which are different from the embodiment of FIGS. 1 through 9 are described in detail.

Also, for easy cross reference, those parts of the embodiment of FIGS. 10–16 which correspond to similar parts in the embodiment of FIGS. 1–9 are identified by similar reference numerals, those of the embodiment of FIGS. 10–16 being distinguished by an index mark.

The hold down rolls 15' and 17' of this embodiment are modified over those of the embodiment of FIGS. 1 to 9.

Reference is made to FIGS. 10–13. The rolls 15' and 17' are mounted on a subassembly base 300, which by means of a wing nut or similar easily removed element (not shown) is secured to the main frame of the apparatus so as to be removable for cleaning purposes.

A post 314 is secured to base 300 and is slotted at its upper end to receive a beam 316 which is mounted on a fixed pivot pin secured to the post. Secured to the underside of the beam 316 is a bracket 318 which carries a spindle upon which hold down roll 17' is mounted. Extending through a threaded hole in beam 316 is a bolt 319 with a knurled head, the lower end of the bolt abutting base 300 and constituting a stop which limits the extent to which the beam may pivot towards the base. A set screw 320 disposed normally to the bolt serves to lock the bolt in a predetermined position for different sizes of frankfurters and other operating conditions. A spring 322 extends between the beam 316 and the post 314 to urge the beam and roller 17' downwardly towards the path of travel of the sausages.

The pivot pin is extended and mounted upon it between collars 302 is a beam 304 which is similar to beam 316 and has a bolt 308, set screw 309 and bracket 306 which carries roll 15'. A spring 310 extends between the beam and a lug 312 fixed to base 300.

Figure 12:
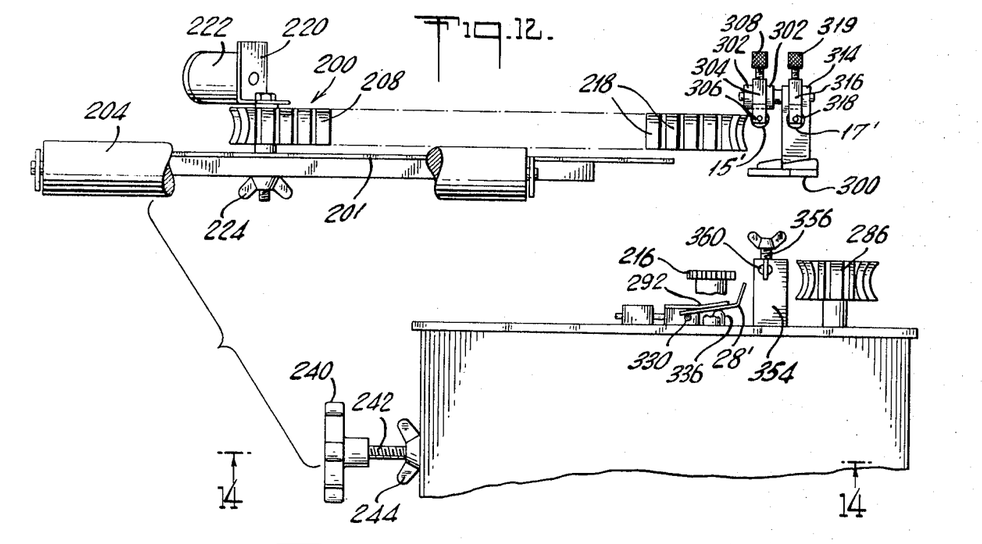
FIG. 12 is a detail of the feed of FIG. 10 with parts removed for clarity.
Figure 13:
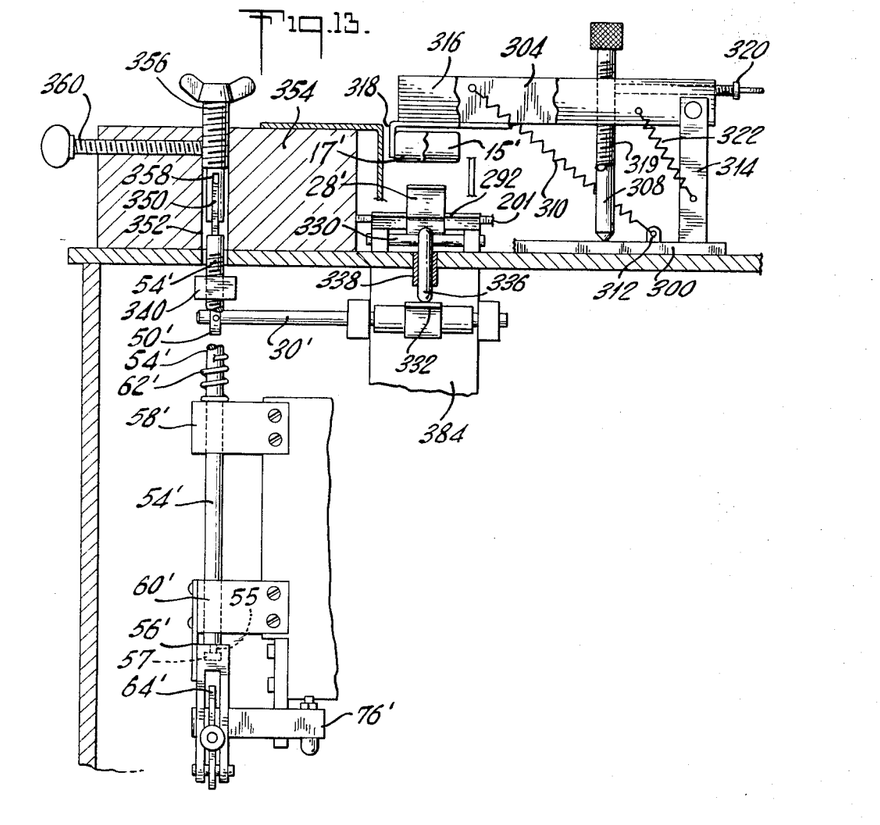
FIG. 13 is a sectional view on the line 13—13 of FIG. 11.
Figure 14:
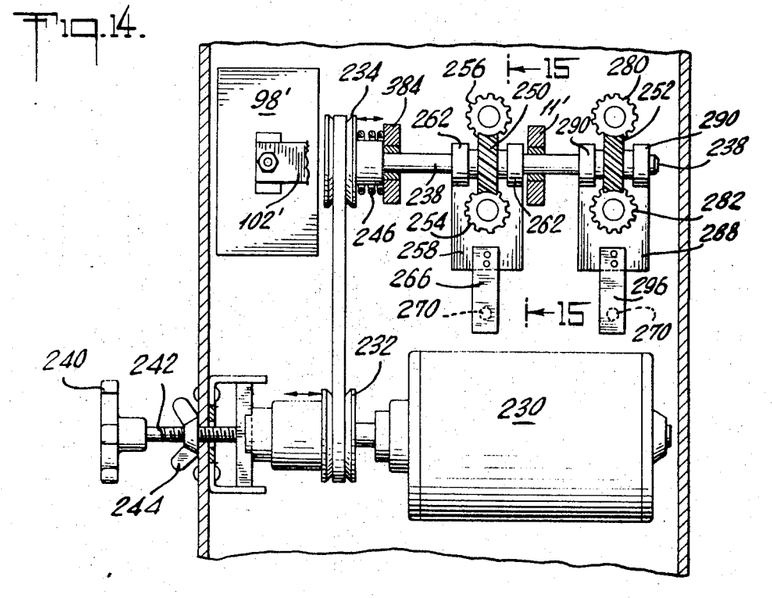
FIG. 14 is a section on line 14—14 of FIG. 12.

It is to be noted from FIG. 13 that the spring 310 is connected to beam 304 at a greater distance from the pivot pin than is spring 322 connected to beam 316, in this way to apply a greater force through beam 304 to the sausages as they enter the cutting region than is applied as they leave that region. It will be appreciated that to remove the subassembly base 300 as shown in FIG. 12 it is not necessary to release the springs.

It will be appreciated that for clearing a snag in the cutting region both hold down rollers can be pivoted away from the path of movement of the sausage.

The ligature sensing and knife operating mechanism of that embodiment is largely similar to that of the embodiment of FIGS. 1–9 but certain changes appear.

It will be noted that the feeler arm 28' is mounted on a simple pivot 330 and is ocnnected to a lever 332 by means of a slidable button 336, the button 336 being mounted in a bushing 338. This is quite distinct from the arrangement of the embodiment of FIGS. 1–9 in which the feeler arm 28 is connected directly to shaft 30. In this second embodiment movement of the feeler arm 28' is transmitted through button 336 and lever 332 to the shaft 30' upon which a connecting lever 50' is secured. The end of lever 50' opposite to shaft 30' is mounted through a slot and pin arrangement to a collar 340 which is screw-threaded upon an upper portion of operating rod or shaft 54'. It is to be noted that in the embodiment of FIGS. 1–9 the lever 50 was directly pivoted through a simple pin and clevis arrangement to the end of rod 54.

As can be seen particularly in FIG. 13 the upper end of rod 54' is flattened as at 350 and extends into an opening 352 formed in block 354.

Screw-threaded into the upper end of opening 352 is a wing bolt 356 the lower end of which is slotted as at 358 and receives the flattened portion 350 of rod 54' so that the rod 54' is axially adjustable.

To secure the wing bolt 356 in a selected position a locking bolt 360 is disposed in a threaded hole normal to and intersecting opening 352.

It will be appreciated that by the adoption of this arrangement it is possible to vary the position of rod 54' and with it of course the position of pawl 64' relatively to beam or operating arm 76' by rotating the rod 54' by means of bolt 356 so that it will move within the collar 340. In this way the period of lost motion between the beginning of downward movement of rod 54' and operation of microswitch 130' can be varied. In this way the delay between the signal from the feeler arm and the knife being operated can be varied to take account of different travel speeds of the line of frankfurters between the sensing position and the cutting position.

The rod 54' is mounted for sliding movement in bearing blocks 58' and 60' and return spring 62' is disposed between collar 340 and the upper bearing block 58'.

To accommodate the rotation of the rod 54' it is secured at its lower end in a block 56' by neck portion 55 and a fastener element 57 in such a way that the rod may rotate about its own axis but also so that movement of the rod 54' axially will be transmitted to block 56' and of course to pawl 64' and the beam 76'.

Element 370 at its end remote from beam 76' has two faces 372 and 374 which intersect at apex 376. These faces cooperated with a roller 378 mounted upon an arm 380 which is pivotable on pin 382 secured to frame element 384. The outer end arm 380 has a switch contacting bolt 386 received in a screw-threaded hold in the arm to be adjustable and a locking bolt 388 is associated with bolt 386 to secure it in an adjusted position. This is shown in the detail of FIG. 17.

The microswitch is arranged to complete the circuit when its operating button is projected so that when the arm 370 moves to the right (clockwise) against a stop 375 in FIG. 11 the roller 378 will move onto the face 372 and the operating button of the microswitch will be projected to complete the circuit to solenoid 98'. When the arm 76' is returned to its normal position the roller 378 will move to face 374. It will be appreciated that with this arrangement the operation of the switch requires minimal forces so that the sensitivity of the feeler 28' is maintained.

These modifications in the linkage provide for greater sensitivity of the device and with lesser pressure between the sensing lever and the sausage. Additionally, the lost motion mechanism may be adjusted without need to adjust the position of the feeler arm 28'.

Additionally, once the lost motion period has been set by means of adjusting the position of rod 54', to make a fine adjustment, while the apparatus is running, to ensure that the knife cuts the ligature centrally, the speed of conveying the frankfurters can be adjusted by means of hand wheel 240.

What is claimed is:

1. A separator mechanism for a ligature-connected line of frankfurters, sausages or the like comprising means for moving said line through a ligature sensing area and a separating area, said sensing area including a sensing device having a feeler for contacting the frankfurters, said moving means causing each ligature between successive frankfurters to be stretched in said separating area, a solenoid driven cutting mechanism, a linkage connecting said feeler to operate a switch controlling said solenoid, said linkage including a switch operating arm and, between the feeler and arm, a link shiftable between a first position to connect said feeler and arm whereby movement of said feeler causes operation of said switch and a second position in which said link disconnects said feeler and operating arm and means preventing movement of said link from said second to said first position until said feeler has moved to a greater extent than a predetermined minimum.

2. A mechanism as claimed in claim 1 wherein said link comprises a pawl pivoted to a shaft connected to said feeler, cam means operable to move said pawl to said second position upon downward movement of the feeler and after completion of a switch actuating operation.

3. A mechanism as claimed in claim 2 wherein preventing means comprises a blocking surface on said switch operating arm.

4. A mechanism as claimed in claim 1 wherein said switch operating arm has a toggle mechanism having two stable positions one of which establishes the switch operating position and the other establishes nonoperating positions thereof, said cutting mechanism comprising a lever constituting means moving said toggle mechanism from said one position to said other position at the completion of a cutting operation.

5. A mechanism as claimed in claim 1 wherein said switch comprises a microswitch, said operating arm includes a pivoted lever and has a switch operating projection, said projection, in the open position of said switch, contacting an operating element of the switch and movable away from said element to close the circuit to the solenoid.

6. A mechanism as claimed in claim 1 wherein said feeler is connected to said linkage through a slidable button, and said linkage includes a lost motion mechanism.

7. A mechanism as claimed in claim 6 wherein said lost motion mechanism is adjustable.

8. A mechanism as claimed in claim 7 wherein said lost motion mechanism comprises a shaft having said link pivoted at one end thereof and spaced from said switch operating arm whereby movement of said arm resulting from movement of said shaft is delayed until said link contacts the arm.

9. A mechanism as claimed in claim 8 wherein said slidable button acts between a pivoted feeler and a follower said follower being connected to a journaled rod to which a connecting link is secured, said connecting link, at its other end being pivotally connected to a collar secured to said shaft and said shaft being longitudinally adjustable within said collar whereby the spacing between the end of the shaft and the switch operating arm is adjustable to adjust the lost motion mechanism.

10. A mechanism as claimed in claim 1 in which said means for moving said line comprises a belt conveyor.

11. A mechanism as claimed in claim 10 in which the speed of said conveyor is adjustable.

12. A mechanism as claimed in claim 10 in which the belt conveyor is driven through a belt and pulley mechanism.

13. A mechanism as claimed in claim 12 in which said belt and pulley mechanism includes variable pitch pulleys.

14. A mechanism as claimed in claim 13 in which one variable pitch pulley is varied by a hand wheel and another is spring biased to accommodate variations in said one pulley.

15. A mechanism as claimed in claim 10 in which said belt conveyor is mounted upon a subassembly frame which is removably mounted upon a main frame.

16. A mechanism as claimed in claim 10 in which said belt conveyor comprises a pair of generally parallel conveyor belts between adjacent courses of which a line path is defined.

17. A mechanism as claimed in claim 16 in which a container for sausages is disposed close to but offset from the ingoing end of said line path whereby a change in direction of the line from the container to the path is made.

18. A mechanism as claimed in claim 4 in which said arm comprises a pivoted lever one end of which cooperates with said pawl and the other end of which has a pair of flats said flats cooperating with a roller to constitute a toggle mechanism.

19. A mechanism as claimed in claim 18 wherein said roller is disposed upon a pivoted lever said lever including a switch contacting element.

20. A mechanism as claimed in claim 19 in which said switch contacting element is adjustable.

21. A mechanism as claimed in claim 1 comprising hold down rolls in the cutting region, said hold down rolls being mounted on a removable subassembly to a main frame.

22. A mechanism as claimed in claim 21 in which said hold down rolls are pivotably mounted on said subassembly and are pivotable out of the cutting region for cleaning.

23. A separator mechanism for a ligature connected line of frankfurters, sausages or the like, comprising a drive means for moving said frankfurter line substantially horizontally through a frankfurter separating area, a sensing device for sensing the location of each of said ligatures, said sensing device having a feeler arm for contacting underneath surfaces of each of said frankfurters, said drive means for the frankfurters causing each ligature between successive frankfurters to be stretched in said frankfurter separating area, a solenoid driven cutting mechanism, a switch element controlling said solenoid cutting mechanism and a linkage operable by said feeler arm to open and close said switch element, said linkage including a toggle lever having two stable positions in one of which said switch element is closed and in the other of which said switch element is opened.

24. A separator mechanism as claimed in claim 23 wherein said toggle lever is connectable to a link element of said linkage intermediate the toggle lever and said feeler arm, through the intermediary of a pawl element.

25. A separator mechanism as claimed in claim 24 wherein said link element comprises a generally axially shiftable rod, said pawl element is pivotally secured to said rod adjacent said toggle lever, and is movable between a position to connect said rod and toggle lever and a position to disconnect said rod and toggle lever.

26. A separate mechanism as claimed in claim 25 wherein said feeler arm comprises a pivotal lever connected to transmit its movement to an intermediate lever, said intermediate lever being connected to said rod, said rod being disposed substantially vertically and being movable up and down by said intermediate lever and resilient means biasing said feeler arm into engagement with the underneath surfaces of said frankfurters.

27. A separator mechanism as claimed in claim 26 wherein said resilient means comprises a spring acting between said rod and a fixed element of said mechanism and urging said rod upwardly and said feeler arm into engagement with underneath surfaces of said frankfurters.

28. A separator mechanism as claimed in claim 26 wherein said toggle lever comprises a blocking surface cooperating with said pawl and constituting means for preventing said pawl from connecting said rod and pawl until said rod makes a minimum upward movement relative to said toggle lever, said minimum upward movement being related to a minimum upward movement of said feeler arm.

29. A separating mechanism as claimed in claim 26 wherein abutment means are provided adjacent said pawl and cooperating therewith to constitute means shifting said pawl to said position to disconnect said pawl from said toggle lever at the end of a downward movement of said rod and to engage said pawl with said blocking surface.

30. A separating mechanism as claimed in claim 29 wherein said toggle lever comprises a first and second flat surfaces, said surfaces cooperating with a resiliently biased detent element, said surfaces defining said two stable positions of said toggle lever.

31. A mechanism as claimed in claim 30 wherein said toggle lever contacts a microswitch operating member.

32. A separator mechanism as claimed in claim 31 wherein said microswitch member comprises a lever, said lever carrying said detent element.

33. A separator mechanism as claimed in claim 23, wherein said cutting mechanism comprises a lever operated by said solenoid, said lever being connected upon the completion of a cutting operation to constitute means to move said toggle lever to the other of said stable positions.

* * * * *